US011134663B2

(12) United States Patent
Hyun

(10) Patent No.: US 11,134,663 B2
(45) Date of Patent: Oct. 5, 2021

(54) FISHING REEL WITH MOVABLE MAGNET BRAKE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 47 days.

(21) Appl. No.: 16/747,217

(22) Filed: Jan. 20, 2020

(65) Prior Publication Data

US 2020/0236918 A1 Jul. 30, 2020

(30) Foreign Application Priority Data

Jan. 30, 2019 (KR) .................. 10-2019-0011869

(51) Int. Cl.
*A01K 89/01* (2006.01)
*A01K 89/0155* (2006.01)
*A01K 89/033* (2006.01)

(52) U.S. Cl.
CPC ...... *A01K 89/01555* (2013.01); *A01K 89/033* (2013.01)

(58) Field of Classification Search
CPC ........ A01K 89/01555; A01K 89/01557; A01K 89/056; A01K 89/058
See application file for complete search history.

(56) References Cited

U.S. PATENT DOCUMENTS

| 6,086,005 | A | * | 7/2000 | Kobayashi | ....... | A01K 89/01555 188/182 |
| 6,126,105 | A | * | 10/2000 | Yamaguchi | ...... | A01K 89/01555 242/288 |
| 2009/0026300 | A1 | * | 1/2009 | Tsutsumi | ......... | A01K 89/01555 242/288 |
| 2009/0127367 | A1 | * | 5/2009 | Tsutsumi | ......... | A01K 89/01555 242/286 |
| 2013/0292504 | A1 | * | 11/2013 | Hyun | ............... | A01K 89/01555 242/289 |
| 2015/0014460 | A1 | * | 1/2015 | Hyun | .................. | A01K 89/0155 242/289 |
| 2016/0037759 | A1 | * | 2/2016 | Ikebukuro | ........ | A01K 89/01555 242/288 |
| 2016/0235048 | A1 | * | 8/2016 | Ikebukuro | ............ | A01K 89/045 |

FOREIGN PATENT DOCUMENTS

| KR | 200144801 | 6/1999 |
| KR | 20120112132 | 10/2012 |
| KR | 20120133584 | 12/2012 |
| KR | 20150006698 | 1/2015 |

* cited by examiner

*Primary Examiner* — Emmanuel M Marcelo
(74) *Attorney, Agent, or Firm* — Cantor Colburn LLP

(57) ABSTRACT

Provided is a fishing reel with movable magnet brake using a centrifugal force, the fishing reel including operation arms hinged in a spool and being rotated by a centrifugal force due to rotation of the spool, and a pad holder coupled to be able to move forward and backward in the longitudinal direction of a spool shaft and having a brake pad receiving attraction of a braking magnet, in which forward and backward positions of the pad holder are changed and the distance between the braking magnet and the brake pad is adjusted in accordance with a rotational angle of the operation arms due to a centrifugal force, whereby the braking force of the magnet brake decreases.

4 Claims, 5 Drawing Sheets

FISHING REEL WITH MOVABLE MAGNET BRAKE

BACKGROUND OF THE INVENTION

Field of the Invention

The present invention relates to a fishing reel with movable magnet brake using a centrifugal force, the fishing reel including a braking magnet disposed outside a first surface of a spool and a brake pad disposed on the first surface of the spool to move forward and backward and reducing a rotational speed of the spool using attraction of the braking magnet. More particularly, the present invention relates to a fishing reel with movable magnet brake using a centrifugal force, the fishing reel including operation arms hinged in a spool and being rotated by a centrifugal force due to rotation of the spool, and a pad holder coupled to be able to move forward and backward in the longitudinal direction of a spool shaft and having a brake pad receiving attraction of a braking magnet, in which forward and backward positions of the pad holder are changed and the distance between the braking magnet and the brake pad is adjusted in accordance with a rotational angle of the operation arms due to a centrifugal force, whereby the braking force of the magnet brake decreases so that only the advantages of the existing centrifugal brake and magnet brake, such as reducing noise, preventing wear, and preventing reduction of casting distance when a spool is rotated at a low speed, can be maximized.

Description of the Related Art

In general, when casting with a bait casting reel for fishing (hereafter, referred to as a 'fishing reel'), the rotational speed of a spool from which a fishing line is released is larger that flying speed of a lure, so the flying distance of the lure is short or the fishing line becomes entangled. This is called a backlash phenomenon.

In order to prevent this backlash phenomenon, a fishing reel generally employs a friction brake that uses physical friction and a magnet brake that uses attraction of magnetism.

As for the friction brake which is classified into a centrifugal brake and an inertial brake in the related art, when the maximum torque is generated in the early stage of casting, the torque is gradually reduced by friction that is generated by a brake shoe coming in direct contact with a brake pad by a centrifugal force etc., and accordingly, the rotational speed of a spool decreases and a rotational braking force of the friction brake decreases (that is, the torque of torque and a braking force are proportioned). However, the friction brake is more advantageous in long-distance casting than the magnet brake, but has a problem that it is difficult to finely control the braking force, and wear is easily generated and noise is increased due to the friction between the brake shoe and the brake pad.

The magnet brake for solving this problem, which is a non-contact type brake unlike the friction brake, reduces the rotational speed of a spool by applying attraction of magnetism to the rotating spool using the magnetism of a plurality of magnets disposed on a reel body.

Magnet brakes of the related art have the advantage that noise and wear of parts are not generated and fine adjustment is easy because a braking magnet and a brake pad are not in contact with each other, but have a problem that a braking force is uniform regardless of the rotational speed of a spool, so a braking force keeps acting even though a spool is rotated at a low speed, and accordingly, the casting distance decreases.

For reference, as relevant technologies in the related art, there are Korean Patent Application Publication No. 10-2015-0006698, Korean Patent Application Publication No. 10-2012-0112132, Korean Utility Model Registration No. 20-0144801, Korean Patent Application Publication No. 10-2012-0133584, etc.

SUMMARY OF THE INVENTION

The present invention has been made in an effort to solve the problems and an objective of the present invention is to provide a fishing reel with a movable magnet brake using a centrifugal force, the fishing reel including operation arms of which a rotational angle is changed in accordance with a centrifugal force, and a pad holder that has a brake pad of which forward and backward positions are changed in accordance with the rotational angle of the operation arms, in which the distance between a brake magnet and the brake pad is automatically adjusted and a braking force is increased/decreased in accordance with the rotational speed of the spool so that the braking force can be precisely controlled, a casting distance can be increased, and convenience in used can be improved by maximizing only the advantages of the existing centrifugal brake and magnet brake, such as reducing noise, preventing wear, and preventing reduction of casting distance when a spool is rotated at a low speed.

In order to achieve the objectives, a fishing reel with movable magnet brake using centrifugal force according to the present invention includes a braking magnet disposed outside a first surface of a spool and a brake pad disposed on the first surface of the spool to move forward and backward and reducing a rotational speed of the spool using attraction of the braking magnet.

The magnet brake includes: operation arms each having an inner end hinged in the spool and each having a pressing head at an outer end such that the pressing head is rotated forward and backward by a centrifugal force due to rotation of the spool; and a pad holder fitted to an end of a spool shaft to move forward and backward in a longitudinal direction of the shaft, having the brake pad mounted on an outer side, and having a rotation space recessed outward around the shaft on an inner surface, accommodating the pressing head, and connected to incline upward from a lowest point at a center to a highest point at an edge, and forward and backward positions of the pad holder are changed and a distance between the braking magnet and the brake pad is adjusted in accordance with a rotational angle of the operation arms, whereby a braking force of the magnet brake is increased or decreased.

The spool may have a separation wall formed at a center and blocking left and right internal spaces, and may have coupling holes formed in the separation wall, and the magnet brake may include an arm holder disposed in one internal space of the spool and having a shaft coupler to which the operation arms are hinged and coupling protrusions fitted in the coupling holes.

The operation arms each may have rotation protrusions protruding from both sides of an inner end thereof, and the arm holder may have the shaft coupler in which the shaft coupler may include a first body having a plurality of rotation grooves that is circumferentially arranged and in which the operation arms are accommodated and shaft grooves that are formed on both inner ends of each of the rotation grooves and in which the rotation protrusions are fitted, and a second body having the coupling protrusions and fitted on an inner side of the first body.

The magnet brake may include an elastic member elastically supporting the pad holder backward away from the braking magnet.

The fishing reel with a movable magnet brake using a centrifugal force according to the present invention employs only the advantages of the friction brake and the magnet brake of the related art, so noise and wear of parts are not generated in use, it is possible to increase a casting distance because a braking force is automatically increased and decreased in accordance with the rotation speed of the spool, and a user can precisely adjust and use a braking force to be suitable for himself/herself.

When the rotational speed of the spool, that is, the centrifugal force drops under a predetermined level, the brake pad automatically returns toward the spool, thereby preventing reduction of a casting distance.

The fishing reel can be compatibly applied regardless of left-handed and right-handed types.

A user can freely adjust and use the intensity of a braking force and the maximum braking force by replacing the operation arms, the elastic body, the washer, the brake pads, etc.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
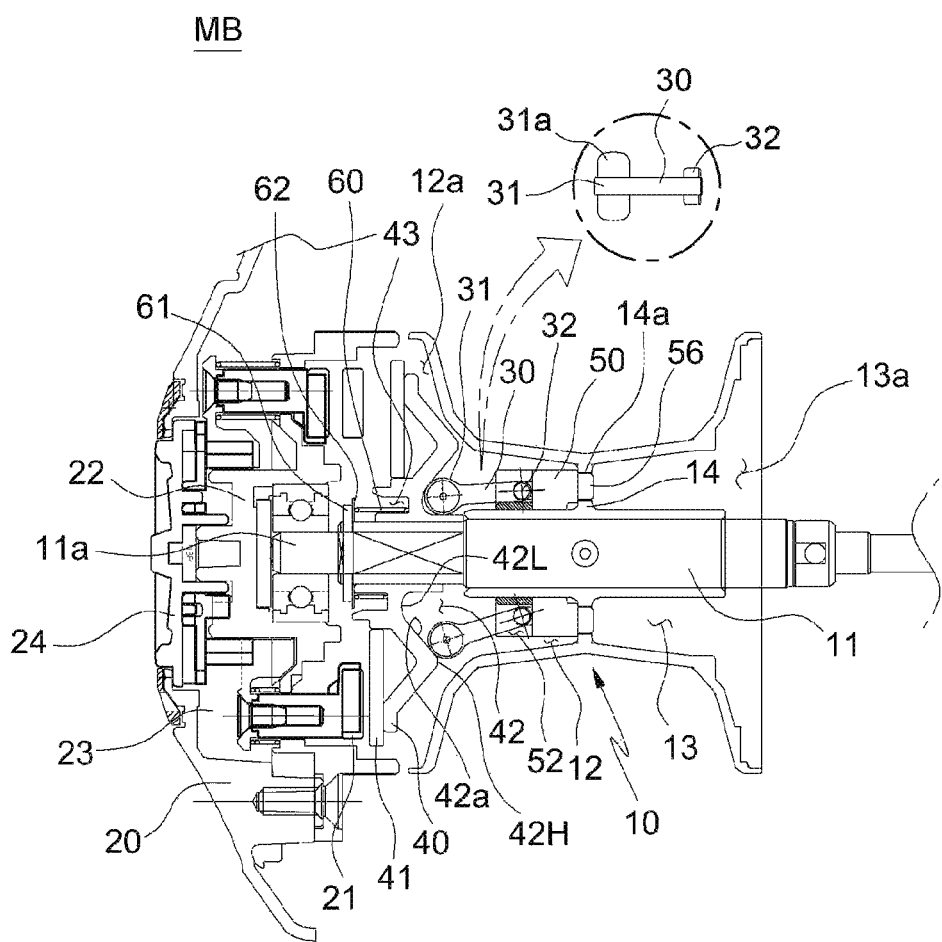
FIG. 1 is a cross-sectional view of main parts of a fishing reel according to the present invention.

The present invention may be modified in various ways and implemented by various exemplary embodiments, so that aspects (or embodiments) will be described in detail. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood on the basis of this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. Singular forms are intended to include plural forms unless the context clearly indicates otherwise.

It will be further understood that the terms "comprises" or "composed of" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose of distinguishing a constitutive element from another constitutive element, but a constitutive element should not be limited to a manufacturing order, and the terms described in the detailed description of the invention may not be consistent with those described in the claims.

Figure 2A:
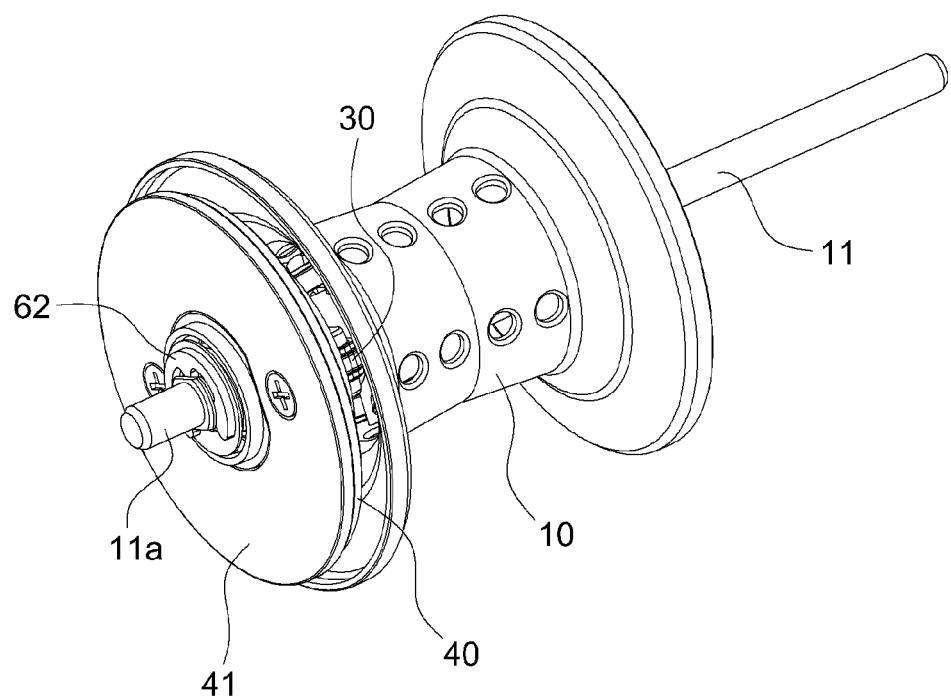
FIG. 2A is an assembly view showing main parts of the fishing reel according to the present invention.
Figure 2B:
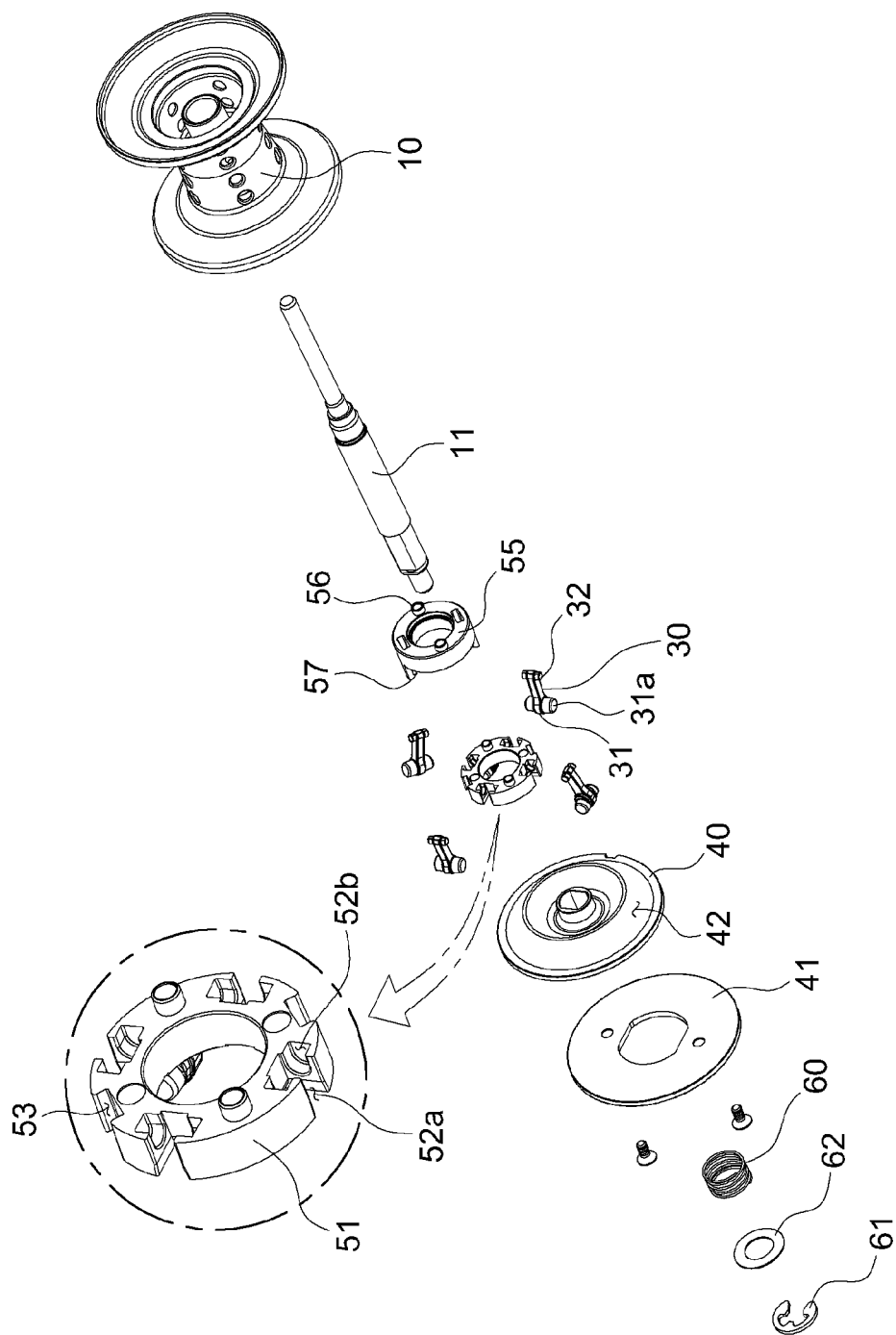
FIG. 2B is an exploded perspective view of FIG. 2A.
Figure 3A:
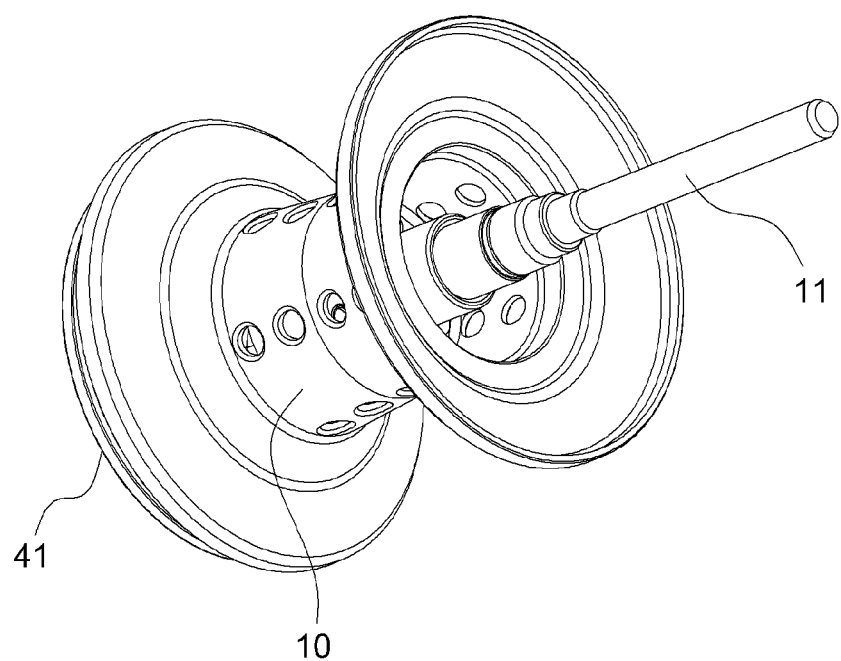
FIG. 3A is an assembly view showing main parts of the fishing reel seen in different direction from that in FIG. 2A.
Figure 3B:
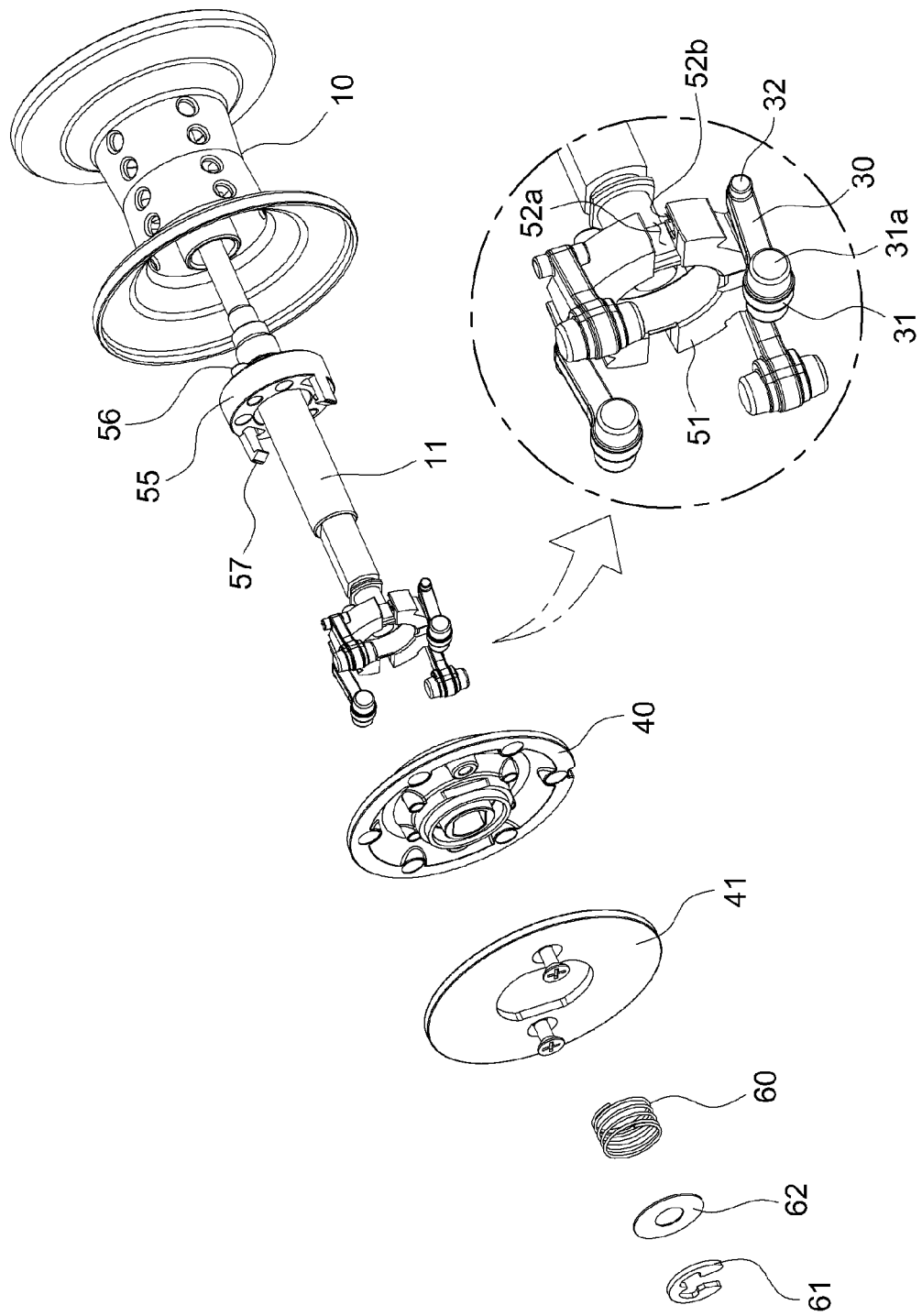
FIG. 3B is an exploded perspective view of FIG. 3A.

For convenience of the description of a fishing reel with a movable magnet using a centrifugal force according to the present invention, when an approximate direction rather than a precise direction is specified with reference to FIGS. 2A and 3A, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereinbelow, a fishing reel with a movable magnet brake using a centrifugal force according to the present invention will be described with reference to the accompanying drawings.

As shown in FIGS. 1 to 3B, the present invention relates to a fishing reel with a movable magnet brake MB, the fishing reel including a braking magnet 21 disposed outside (at a left side in the figures) a first surface of a spool 10, and a brake pad 41 disposed on the first surface of the spool to move forward and backward and reducing a rotational speed of the spool 100 using attraction of the braking magnet 21.

The magnet brake MB includes: operation arms 30 each having an inner (right in the figure) end hinged in the spool 10 and each having a pressing head 31 at an outer end such that the pressing head 31 is rotated forward/backward by a centrifugal force due to rotation of the spool 10; and a pad holder 40 fitted to an end of a spool shaft 11 to move forward/backward in the longitudinal direction of the shaft 11, having the brake pad 41 mounted on an outer side, and having a rotation space 42 recessed outward around the shaft 11 on an inner surface, accommodating the pressing head 31, and connected to incline upward from a lowest point 42L at a center to a highest point 42H at the edge.

The forward and backward positions of the pad holder 40 are changed and the distance between the braking magnet 21 and the brake pad 42 is adjusted in accordance with the rotational angle of the operation arms 30, whereby the braking force of the magnet brake MB is increased or decreased.

First, the spool 10 has both ends that are rotated about a spool shaft 11 fitted in a main body frame (not shown, in more detail, a palm-sided side cover 20 and a gear-sided side cover (not shown)) in a bobbin-shaped drum structure, in which a separation wall 14 blocking left and right internal spaces 12 and 13 is formed at the center and sides of the left and right internal spaces 12 and 13 are respectively connected to open expanding portions 12a and 13a.

The spool 10 has the operation arms 30, a pad holder 40, and an arm holder 50 (described below) in one (left in the figures) internal space 12, coupling holes 14a are formed at the separation wall 14, and coupling protrusions 56 of the arm holder 50 (in detail, a second body 55) are fitted in the coupling holes 14a.

A spool cover 22 having a bearing supporting a shaft part 11a of the shaft 11 is disposed inside the palm-sided side cover 20 and the braking magnet 21 is fixed to a moving body 23 coupled between the palm-sided side cover 20 and the spool cover 22.

The moving body 23 is moved forward/backward in the longitudinal direction of the shaft 11 by a braking dial 24 exposed outside the palm-sided side cover 20, so a user can adjust the position (position where a maximum braking force is generated) of the braking magnet 21 through the braking dial 24.

Although an embodiment in which the moving body 23 on which the braking magnet 21 is mounted is provided separately from the spool cover 22 is representatively shown in the figures, the braking magnet 21 may be mounted on the spool cover 22 without the moving member 23 and the spool cover 22 itself may be moved forward/backward in the longitudinal direction of the shaft 11 by the dial 24.

The operation arms 30 each have weight protrusions 31a protruding from both sides of the pressing head 31, thereby increasing a pressing force against the pad holder 40 when the operation arms 30 are rotated outward from the shaft 11 by a centrifugal force.

Further, the operation arms 30 each have rotary protrusions 32 protruding from both sides of an inner end thereof and the rotary protrusions 32 are fitted in shaft grooves 52b formed in a first body 51 of the arm holder 50.

The shaft 11 is fitted through the center of the pad holder 40 and the brake pad 41 is coupled to the outer side (the left side in the figures) of the pad holder 40 by bonding, bonding, press-fitting, etc.

The pad holder 40 has a ring type pileus shape in which the edge of a shaft hole protrudes inward, and the rotation space 42 is formed on the inner side of the pileus.

The rotation space 42 has a lowest point 42L recessed outward in the longitudinal direction of the shaft 11 at the center portion adjacent to the shaft 11 and a highest position 42H protruding inward in the longitudinal direction of the shaft 11 at the edge that is spaced away from the shaft, and an inclined surface 42a having a height that changes with a predetermined angle is connected between the lowest point 42L and the highest point 42H.

The distance between the lowest point 42L and the highest point 42H (i.e., the width of the rotation space 42) is larger than the diameter of the pressing head 31 so that the operation arms 30 can move forward/backward, and the rotational angle of the operation arms 30 may be about 20° or more, but may be variously changed, depending on the specifications such as a size of the operation arms 30.

The pad holder 40 has a supporting groove 43 recessed on the inner side around the shaft hole and an elastic member 60 to be described below supports the bottom of the supporting groove 43.

The magnet brake MB of the present invention further includes an arm holder 50 disposed in the internal space 12 of the spool 10 and having a shaft coupler 52 to which the operation arms 30 are hinged and coupling protrusions 56 fitted in the coupling holes 14a.

In detail, the arm holder 50 has the shaft coupler 52 and the shaft coupler 52 includes a first body 51 having a plurality of rotation grooves 52a that is circumferentially arranged and in which the operation arms 30 are accommodated and shaft grooves 52b that are formed on both inner ends of each of the rotation grooves 52a and in which the rotation protrusions 32 are fitted, and a second body 55 having the coupling protrusions 56 and fitted on the inner side of the first body 51.

The shaft 11 is disposed through the centers of the first and second bodies 51 and 55 and is fixed to the spool 10 by fitting the coupling protrusions 56 in the coupling holes 14a, so the first and second bodies 51 and 55, that is, the arm holder 50 rotates with the spool 10.

The first body 51 has a plurality of rotation grooves 52a formed in the edge and circumferentially arranged around the shaft hole and the rotation grooves 52a are formed by opening the inner and outer surfaces and the outer circumferential surface of the first body 51.

The shaft grooves 52b are recessed on both inner ends of each of the rotation grooves 52a and are formed by opening the rear side of the first body 51.

When the rotation protrusions 32 are fitted in the shaft grooves 52b, the shaft coupler 52 is coupled and the operation arms 30 are received in the rotation grooves 52a, so when the spool 10 is rotated, a centrifugal force is applied to the operation arms 30, so the pressing heads 31 of the operation arms 30 are rotated outward from the first body 51.

The first body 51 has groove-shaped locking portions between adjacent rotation grooves 52a, so hook protrusions 57 of the second body 55 are locked in the locking portions 53.

The second body 55 blocks the inner openings of the rotation grooves 52a and the shaft grooves 52b to prevent separation of the operation arms 30 and allow the first body 51 and the operation arms 30 to rotate with the spool 10.

The coupling protrusions 56 are formed on the inner side around the shaft hole and the hook protrusions 57 are formed on the edge of the outer side.

The magnet brake MB includes the elastic member 60 elastically supporting the pad holder 40 backward away from the braking magnet 21.

The elastic body 60, which is a compression spring fitted on the shaft part 11a of the shaft 11 and applying elasticity in the opposite direction to compression, has a first end supported by a washer 62 fixed by a retainer 61 at a predetermined position on the shaft part 11a and a second end inserted and supported in the supporting groove 43, thereby forcing the pad holder 40, that is, the brake pad 41 to move backward away from the magnet 21.

The operation and effects of the present invention having the configuration described above are described hereafter.

First, a user can adjust the position where a maximum braking force is generated by adjusting the position of the braking magnet 21 through the dial 24.

That is, the shorter the distance between the braking magnet 21 and the brake pad 41, the shorter the section where the brake pad 41 comes closest to the braking magnet 21, so the maximum braking force is generated even though the spool 10 is rotated at a relatively low speed.

On the contrary, the longer the distance between the braking magnet 21 and the brake pad 41, the longer the section where the brake pad 41 comes closest to the braking magnet 21, so the maximum braking force can be generated when the spool 10 is rotated at a relatively high speed.

Next, when casting is not performed, that is, the spool 10 is not rotated, the pad holder 40 is pushed toward the spool 10 by the elastic member 60 and the pressing heads 31 of the operation arms 30 are rotated toward the shaft 11 and positioned at the lowest position 42L of the rotation space 42 by the inclined surface 42a. In this case, the distance between the braking magnet 21 and the brake pad 41 is the maximum, so a braking force is not generated.

When casting is performed in this state, a fishing line is unwound and the spool 10 is rotated. When the spool 10 is rotated at a predetermined speed or more, a centrifugal force is applied to the pressing heads and the operation arms 30 are opened outward away from the shaft 11. Accordingly, the pressing heads 31 move on the inclined surface 42a toward the highest point 42H and move forward the pad holder 40, that is, the braking pad 41 toward the braking magnet 21, whereby braking force is generated by the braking magnet 21 itself. Further, when the pressing heads 31 reach the highest point 42H, the braking pad 41 is positioned closest to the braking magnet 21, so the maximum braking force is generated.

Further, as the rotational speed of the spool 10 decreases, the centrifugal force decreases and the elasticity of the elastic member 60 becomes larger than the centrifugal force and moves the pad holder 40 backward such that the braking pad 41 moves back away from the braking magnet 21, whereby the braking force decreases.

Therefore, according to the present invention, since the distance between the braking magnet 21 and the braking pad 41 is automatically adjusted by a centrifugal force that changes in accordance with the rotational speed of the spool 10, it is possible to prevent backlash. Further, the braking force is automatically increased and decreased in accordance with the rotational speed of the spool 10, so it is possible to prevent the casting distance from being decreased by the braking force.

In addition, according to the present invention, since the braking pad 41 is not in contact with the braking magnet 21, it is possible to prevent noise and wear of parts due to friction and it is also possible to easily maintain an optimal braking force suitable for the real-time rotational speed of the spool 10 even without specific adjustment during casing.

Further, it is possible to set a braking force suitable for a user by changing the weight of the operation arms 30, changing the elasticity of the elastic member 60, or changing the thickness or the material of the brake pad 41.

That is, if the pressing heads 31 of the operation arms 30 are heavy, a relatively large braking force corresponding to the weight can be obtained, and if the pressing heads 31 of the operation arms 30 are light, a relatively small braking force corresponding to the weight can be obtained.

Further, it is possible to obtain a relatively large braking force by decreasing the elasticity of the elastic body 60 and to obtain a relatively small braking force by increasing the elasticity of the elastic body 60.

Further, it is possible to obtain a relatively large braking force by increasing the thickness of the brake pad or replacing the material with a material applying larger attraction, and it is also possible to obtain a relatively small braking force by decreasing the thickness of the brake pad 41 or replacing the material with a material applying smaller attraction.

Further, a user can freely change the timing at which the maximum braking force is generated, by changing the thickness of the washer 62 supporting the elastic member 60.

As described above, according to the present invention, it is possible to remove all the disadvantages in the friction brake operation mechanism and the braking principle using a magnet brake in the related art and it is possible to achieve only advantages through one braking system, so it is possible to provide a user with a new concept braking way that is convenient to use.

Further, although a fishing reel with a movable magnet brake using a centrifugal force was described with reference to the accompanying drawings, the present invention may be changed, modified, and replaced in various ways by those skilled in the art, and the change, modification, and replacement should be construed as being included in the protective range of the present invention.

What is claimed is:

1. A fishing reel with movable magnet brake using centrifugal force, the fishing reel including a braking magnet disposed outside a first surface of a spool and a brake pad disposed on the first surface of the spool to move forward and backward and reducing a rotational speed of the spool using attraction of the braking magnet, wherein the magnet brake includes: operation arms each having an inner end hinged in the spool and each having a pressing head at an outer end such that the pressing head is rotated forward and backward by a centrifugal force due to rotation of the spool; and a pad holder fitted to an end of a spool shaft to move forward and backward in a longitudinal direction of the shaft, having the brake pad mounted on an outer side, and having a rotation space recessed outward around the shaft on an inner surface, accommodating the pressing head, and connected to incline upward from a lowest point at a center to a highest point at an edge, and forward and backward positions of the pad holder are changed and a distance between the braking magnet and the brake pad is adjusted in accordance with a rotational angle of the operation arms, whereby a braking force of the magnet brake is increased or decreased.

2. The fishing reel of claim 1, wherein the spool has a separation wall formed at a center and blocking left and right internal spaces, and has coupling holes formed in the separation wall, and the magnet brake includes an arm holder disposed in one internal space of the spool and having a shaft coupler to which the operation arms are hinged and coupling protrusions fitted in the coupling holes.

3. The fishing reel of claim 2, wherein the operation arms each have rotation protrusions protruding from both sides of an inner end thereof, and the arm holder has the shaft coupler, wherein the shaft coupler includes a first body having a plurality of rotation grooves that is circumferentially arranged and in which the operation arms are accommodated and shaft grooves that are formed on both inner ends of each of the rotation grooves and in which the rotation protrusions are fitted, and a second body having the coupling protrusions and fitted on an inner side of the first body.

4. The fishing reel of claim 1, wherein the magnet brake includes an elastic member elastically supporting the pad holder backward away from the braking magnet.

* * * * *